(12) United States Patent
Ozerov et al.

(10) Patent No.: US 10,114,891 B2
(45) Date of Patent: Oct. 30, 2018

(54) METHOD AND SYSTEM OF AUDIO RETRIEVAL AND SOURCE SEPARATION

(71) Applicant: THOMSON LICENSING, Issy de Moulineaux (FR)

(72) Inventors: Alexey Ozerov, Rennes (FR); Patrick Perez, Rennes (FR); Louis Chevallier, La Meziere (FR); Lionel Oisel, La Nouaye (FR)

(73) Assignee: Thomson Licensing (FR)

( * ) Notice: Subject to any disclaimer, the term of this patent is extended or adjusted under 35 U.S.C. 154(b) by 436 days.

(21) Appl. No.: 14/578,333

(22) Filed: Dec. 19, 2014

(65) Prior Publication Data

US 2015/0178387 A1     Jun. 25, 2015

(30) Foreign Application Priority Data

Dec. 20, 2013 (EP) .................................... 13306808

(51) Int. Cl.
 *G06F 7/00* (2006.01)
 *G06F 17/30* (2006.01)
 *G10L 21/0272* (2013.01)

(52) U.S. Cl.
 CPC .. *G06F 17/30761* (2013.01); *G06F 17/30743* (2013.01); *G06F 17/30749* (2013.01); *G06F 17/30758* (2013.01); *G10L 21/0272* (2013.01)

(58) Field of Classification Search
 CPC ......... G06F 17/30758; G06F 17/30749; G06F 17/30755; G06F 17/30761; G06F 17/30746; G06F 17/30787; G06F 17/30023; G06F 17/30026
 See application file for complete search history.

(56) References Cited

U.S. PATENT DOCUMENTS

| | | | |
|---|---|---|---|
| 6,345,252 B1* | 2/2002 | Beigi ................ | G06F 17/30746 704/251 |
| 7,225,124 B2* | 5/2007 | Deligne .............. | G10L 21/0272 704/233 |
| 7,444,353 B1* | 10/2008 | Chen ................. | G06F 17/30743 |
| 8,239,052 B2* | 8/2012 | Itoyama ............... | G10H 1/0008 700/94 |
| 2002/0038597 A1* | 4/2002 | Huopaniemi ..... | G06F 17/30743 84/609 |
| 2004/0002310 A1 | 1/2004 | Herley et al. | |

(Continued)

OTHER PUBLICATIONS

Klapuri et al: "Sound source separation in monaural music signals using excitation-filter model and em algorithm"; Acoustics Speech and Signal Processing (ICASSP), 2010 IEEE International Conference on, IEEE; Mar. 14, 2010, pp. 5510-5513.

(Continued)

*Primary Examiner* — Hasanul Mobin
(74) *Attorney, Agent, or Firm* — Jack Schwartz & Associates, PLLC

(57) ABSTRACT

A method and a system of audio retrieval and source separation are described. The method comprises the steps of: receiving a textual query; retrieving a preliminary audio sample from an auxiliary audio database; retrieving a target audio sample from a target audio database; and separating the retrieved target audio sample into a plurality of audio source signals. The corresponding system comprises an input unit, a storing unit and a processing unit to implement the method.

16 Claims, 3 Drawing Sheets

(56) References Cited

U.S. PATENT DOCUMENTS

| | | | | |
|---|---|---|---|---|
| 2006/0217828 | A1* | 9/2006 | Hicken | G06F 17/30743 700/94 |
| 2008/0140406 | A1* | 6/2008 | Burazerovic | G10L 13/00 704/260 |
| 2009/0066798 | A1* | 3/2009 | Oku | G03B 31/00 348/207.99 |
| 2010/0026780 | A1* | 2/2010 | Tico | G10L 21/0208 348/14.02 |
| 2010/0174389 | A1* | 7/2010 | Blouet | G10L 21/028 700/94 |
| 2010/0254539 | A1* | 10/2010 | Jeong | G10L 21/0272 381/56 |
| 2010/0257129 | A1* | 10/2010 | Lyon | G06F 17/30743 706/12 |
| 2011/0084914 | A1* | 4/2011 | Zalewski | G06F 3/0426 345/173 |
| 2012/0150890 | A1* | 6/2012 | Jeong | G06F 17/30787 707/758 |
| 2013/0121506 | A1* | 5/2013 | Mysore | G10L 21/028 381/94.2 |
| 2013/0132077 | A1* | 5/2013 | Mysore | G10L 21/028 704/233 |
| 2014/0044279 | A1* | 2/2014 | Kim | G10L 21/0272 381/92 |

OTHER PUBLICATIONS

Bardeli: "Similarity Search in Animal Sound Databases";IEEE Transactions on Multimedia, vol. 11, No. 1, pp. 68-76, Jan. 2009.

Helen et al: "Query by Example in Large Databases Using Key-Sample Distance Transformation and Clustering";Ninth IEEE International Symposium on Multimedia 2007—Workshops; pp. 1-6.

Itoyama et al: "Query-by-Example Music Information Retrieval by Score-Informed Source Separation and Remixing Technologies"; EURASIP Journal on Advances in Signal Processing; vol. 2010, Article ID 172961, 14 pages.

Lenoir etal: "MuMa: A Scalable Music Search Engine Based on Content Analysis"; 2012 10th International Workshop on Content-Based Multimedia Indexing (CBMI); pp. 1-4.

Wichern etal: "Unifying Semantic and Content-Based Approaches for Retrieval of Environmental Sounds"; 2009 IEEE Workshop on Applications of Signal Processing to Audio and Acoustics; Oct. 18-21, 2009, pp. 13 to 16.

Benaroya etal: "Audio Source Separation With a Single Sensor"; IEEE Transactions on Audio, Speech, and Language Processing, vol. 14, No. 1, pp. 191-199, Jan. 2006.

Parkhi etal: "On-The-Fly Specific Person Retrieval";Int. W. Image Analysis for Multimedia Interactive Services, 2012;Departement of Engineering Science, University of Oxford, United Kingdom; pp. 1-4.

Chechik et al: "Large-Scale Content-Based Audio Retrieval from Text Queries"; ACM International Conference on Multimedia Information Retrieval, MIR 2008, Vancouver, Canada; pp. 1-8.

El Badawy et al: "On-the-fly audio source separation"; https://hal.inria.fr/hal-01023221;submitted on Jul. 11, 2014;2014 IEEE International Workshop on Machine Learning for Signal Processing, Sep. 21-24, 2014, pp. 1-7.

Search Report dated Mar. 24, 2014.

* cited by examiner

METHOD AND SYSTEM OF AUDIO RETRIEVAL AND SOURCE SEPARATION

This application claims the benefit, under 35 U.S.C. § 119 of European Patent Application No. 13306808.0, filed Dec. 20, 2013.

FIELD OF THE INVENTION

The present invention relates to a method and a system of audio retrieval and source separation in an audio database. In particular, the method and system utilize a combined text-and-example based approach for audio retrieval and source separation. The invention further relates to a computer readable medium suitable for such a method or system.

BACKGROUND OF THE INVENTION

With the increasing ubiquity of internet connection and mobile devices as well as the development of media technology, the amount of freely available and private multimedia data has exploded. It becomes an essential issue to acquire useful and desired information from the mass multimedia data. In other words, the efficient management and retrieval of information resources from a multimedia database becomes more important.

Audio retrieval refers to searching for an audio sample in an audio database, for which most of the existing approaches are either example-based or text-based. In the case of an example-based approach, the audio retrieval is performed with the help of an audio example similar to the target audio sample to be retrieved. On the other hand, for a text-based approach, the audio retrieval is performed based on some text information describing the audio content one looks for. Specifically, the latter is conducted through the comparison and matching of the provided text information with those associated to the audio database.

The text-based approach is basically easier and more efficient than the example-based approach. Text information associated to the audio database as well as the provided query is easier to be created by a user than a precise audio example. The requirements for an audio retrieval system to conduct text-based retrieval are relatively lower. In addition, the example-based approaches are often cumbersome and do not facilitate user interaction with the retrieval system. However, there is a problem that the text-based approach is inapplicable when it comes to a lack of textual information associated to the audio database.

In addition to audio retrieval, audio source separation is another important technique for efficient utilization of an audio database. Since the retrieved audio sample, either by text- or example-based approach, is commonly mixed with other unexpected audio data, an additional step of audio source separation is required for purifying the audio data into simpler and more precise audio sources. For example, a mixed audio record can contain both bird singings and wind sounds, of which the former is the main audio source of interest and the latter is unfavorite background sounds.

For audio source separation, most of the existing approaches require some preliminary source examples to achieve an acceptable separation quality, namely the example-based approach is more general. The simpler and more efficient text-based approach for audio source separation is not yet addressed in the field.

SUMMARY OF THE INVENTION

It is an objective of the present invention to propose an improved solution for audio retrieval and source separation, specifically based on a combined text-and-example based approach.

According to a first aspect of the invention, a method of audio retrieval and source separation in a target audio database comprises: receiving a textual query associated to a target audio sample; retrieving a preliminary audio sample from an auxiliary audio database by matching the textual query with semantic information associated to the auxiliary audio database; retrieving the target audio sample from the target audio database by matching the preliminary audio sample with the target audio database; and separating the retrieved target audio sample into a plurality of audio source signals.

Accordingly, a system of audio retrieval and source separation in an audio database comprises: a storing unit for storing a target audio database; an input unit for receiving a textual query associated to a target audio sample; and a processing unit for retrieving a preliminary audio sample from an auxiliary audio database by matching the textual query with semantic information associated to the auxiliary audio database, for retrieving the target audio sample from the target audio database by matching the preliminary audio sample with the target audio database, and for separating the retrieved target audio sample into a plurality of audio source signals.

Also, a computer readable medium has stored therein instructions for managing metadata associated to media data, which, when executed by a computer, cause the computer to: receive a textual query associated to a target audio sample; retrieve a preliminary audio sample from an auxiliary audio database by matching the textual query with semantic information associated to the auxiliary audio database; retrieve the target audio sample from the target audio database by matching the preliminary audio sample with the target audio database; and separate the retrieved target audio sample into a plurality of audio source signals.

BRIEF DESCRIPTION OF THE DRAWINGS

For a better understanding the invention shall now be explained in more detail in the following description with reference to the figures. It is understood that the invention is not limited to this disclosed exemplary embodiments and that specified features can also expediently be combined and/or modified without departing from the scope of the present invention as defined in the appended claims.

DETAILED DESCRIPTION OF PREFERRED EMBODIMENTS

In the following the present invention shall be explained for the method and the system for audio retrieval and source separation in an audio database. The audio database can either be associated with or not some semantic information such as tags, file names, corresponding web pages, etc. The semantic information preferably identifies the content of the audio data of the database and can be used for text-based audio retrieval and source separation. However, the method according to the present invention is particularly useful and feasible for an audio database without semantic information associated thereto, where general text-based audio retrieval is not applicable. In addition, the audio database referred hereinafter is preferably a local or private database.

Figure 1:
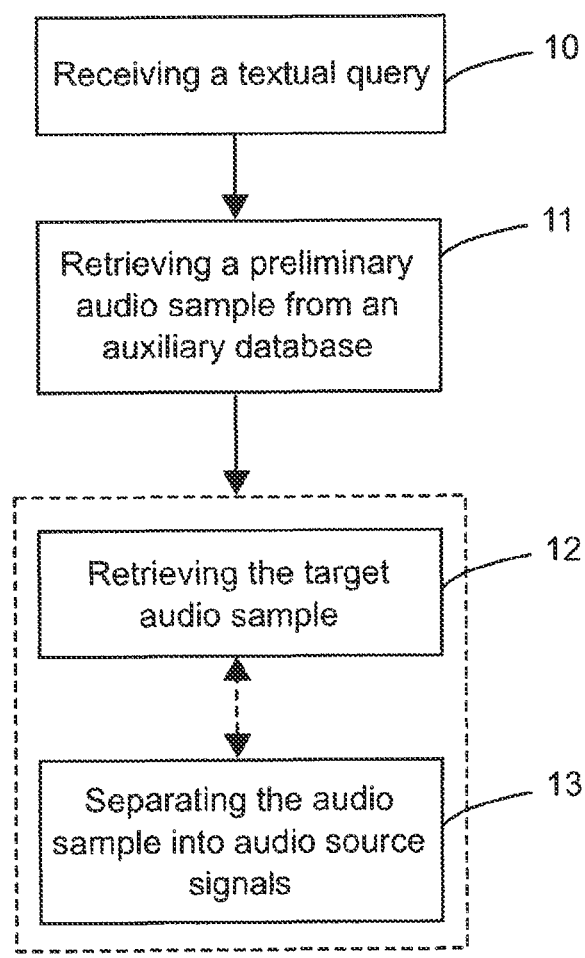
FIG. 1 is a flow chart illustrating a first embodiment of the method of audio retrieval and source separation according to this invention.

Referring to FIG. 1, one embodiment of the method of audio retrieval and source separation in a target audio database according to the present invention comprises: receiving 10 a textual query associated to a target audio sample; retrieving 11 a preliminary audio sample from an auxiliary audio database; retrieving 12 the target audio sample from the target audio database; and separating 13 the retrieved target audio sample into a plurality of audio source signals. The received text query describes the audio content a user looks for, for example, dog barking, bird singing, etc., and is provided by a user through a user input device or the like. Of course, the length, formality and/or other characteristics of the text query are not limited and are flexible for different demand.

Upon receipt 10 of the textual query, a preliminary audio sample is retrieved 11 from an auxiliary audio database associated with at least some semantic information. The auxiliary audio database is a database different from the target audio database where a user looks for the target audio sample, and is preferably a public and easy-accessible database such as open source search engines like Google and FoundSounds. Alternatively, the auxiliary database can be a local or any type of database which is preparatory for the audio retrieval and source separation of the present invention. Since there is at least some semantic information associated to the auxiliary database, the retrieval of the preliminary audio sample is performed by matching the received textual query with the semantic information of the auxiliary database. In other words, the audio retrieval can be conducted based on any known text-based audio retrieval technique in the field.

The retrieval 12 of the target audio sample is then performed in the target audio database by matching the preliminary audio sample with the target audio database. Since there is now a preliminary audio sample available, the retrieval of the target audio sample can be performed based on any example-based retrieval technique, without regard to the lack of semantic information of the target audio database. It should be understood that the example-based retrieval here can be conducted with any known techniques in the field.

If the retrieved target audio sample is an audio mixture composed of target audio signals and unfavorite audio backgrounds, the retrieved target audio sample can be separated 13 into a plurality of audio source signals by any known techniques for audio source separation, for example any general example-based approaches. By performing the step of audio source separation, the audio source signals is differentiated and separated. Preferably, the retrieved target audio sample includes at least one audio source signal corresponding to the received textual query and at least one audio source signal not corresponding to the textual query. In that case, the source separation of the retrieved audio sample is more precise with the help of the received textual query.

Further preferably, the steps of retrieving 12 the target audio sample from the target audio database and separating 13 the retrieved target audio sample are conducted simultaneously, as shown in FIG. 1. In other words, by combining and implementing any known techniques for audio retrieval and audio source separation, the method according to the present invention performs the audio retrieval and source separation in a joint, simpler and more efficient way. The joint audio retrieval and source separation can lead to enhanced quality for both tasks, in contrast to performing the two tasks in an independent or sequential manner. Moreover, although the target audio database is not associated with semantic information, it is now feasible to implement the relatively easier text-based audio retrieval and source separation in the target audio database according to this method.

Figure 2:
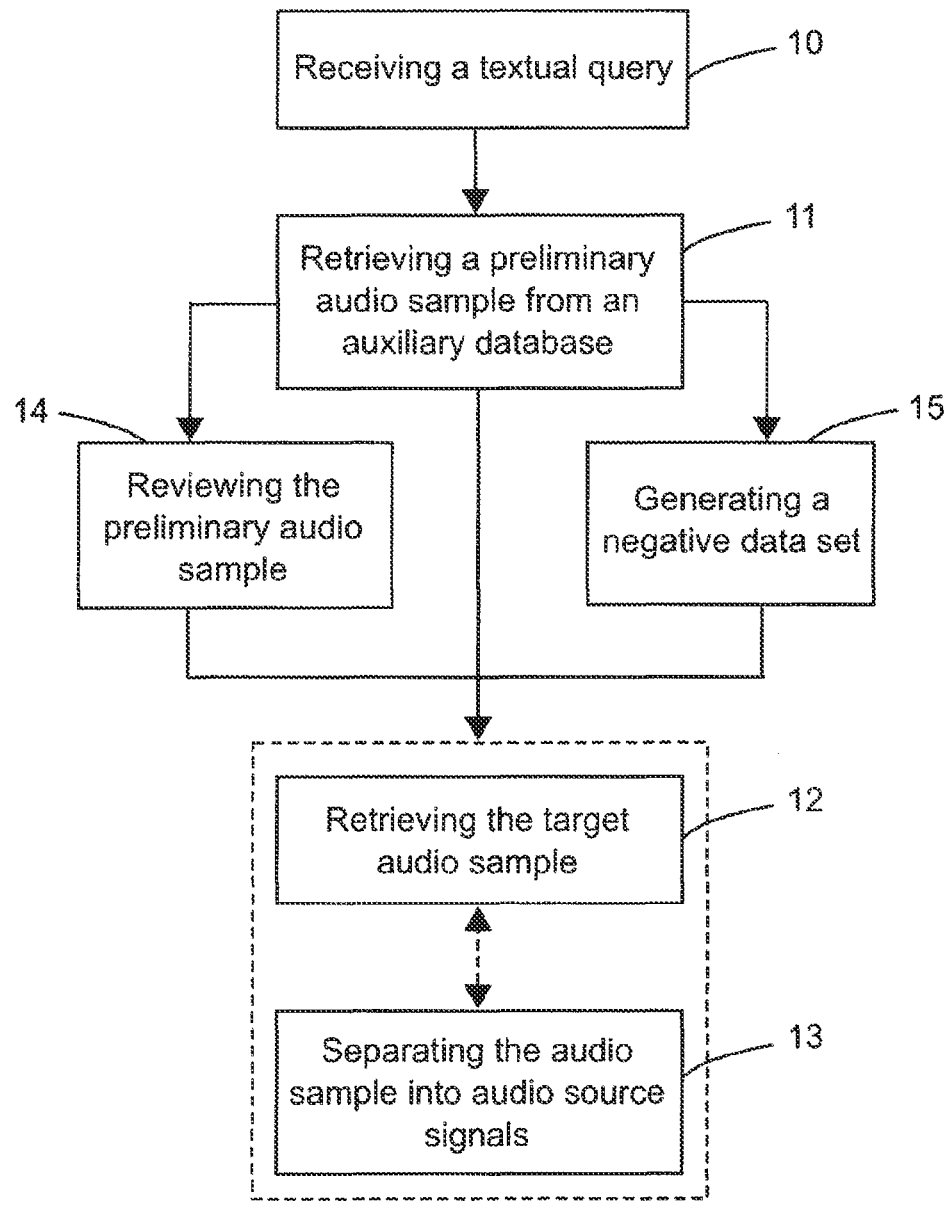
FIG. 2 is a flow chart illustrating a second embodiment of the method of audio retrieval and source separation according to this invention.

FIG. 2 shows a second embodiment for the method of audio retrieval and source separation according to the present invention. This embodiment differs from the first embodiment in that, the method further comprises a step of reviewing 14 the retrieved preliminary audio sample and/or a step of generating 15 a negative data set.

After the retrieval of the preliminary audio sample from the auxiliary database, the retrieved preliminary audio sample can be reviewed 14. Preferably, the reviewing 14 includes segmenting or filtering the retrieved preliminary audio sample, and is conducted upon receipt of a user input. A user can select audio samples or regions within the retrieved preliminary audio samples, and therefore examine and refine the preliminary retrieval result which is used for subsequent audio retrieval and source separation of the target audio sample. For example, the user can select temporal or time-frequency regions of the audio sample to refine the audio retrieval. Preferably, with the help of a user input, a user can interact with and assist the audio retrieval and source separation at any stage of the method.

A negative data set can be generated 15 for the method of audio retrieval and source separation according to the present invention. The negative data set refers to an audio data set including negative audio samples that are unfavorite corresponding to the target audio sample one looks for. The negative data set can be generated from the auxiliary database where the preliminary audio sample is retrieved or from a second auxiliary database. In other words, the negative data set is a data set of negative samples which can be learned and generated as a preparative of the audio retrieval and source separation. With the availability of a negative data set, the retrieval of the target audio sample from the target audio database includes comparing the target audio sample with the negative data set, thus discarding the unfavorite samples more efficiently and improving the retrieval result.

Further embodiments of the method of audio retrieval and source separation according to the present invention comprise iterating some or all of the above mentioned steps of the method. For example, one embodiment can iterate the steps of providing 10 a textual query, retrieving 11 a preliminary audio sample, retrieving 12 the target audio sample, and separating 13 the audio sample into audio source signals. Another embodiment can iterate merely the steps of reviewing 14 the preliminary audio sample, retrieving 12 the target audio sample, and separating 13 the audio sample into audio source signals. The iteration is flexible and adjustable according to different users' demands. By iterating only some of the steps, the whole procedure of audio retrieval and source separation becomes more efficient and less time-consuming.

Moreover, the method according to this invention is not limited to audio samples as described in the above embodiments. The method can also be extended to retrieval and source separation for multimedia samples such as video and images.

Another embodiment of the method according to this invention is used for audio source separation particularly. This embodiment of the method comprises: receiving an audio mixture; receiving a textual query describing a target source signal of the audio mixture; retrieving a preliminary source sample from an auxiliary audio database by matching the textual query with semantic information associated to the auxiliary audio database; and separating the received audio mixture into a plurality of audio source signals by matching the preliminary source sample with the received audio mixture. The textual query can be provided by a user who listens to the audio mixture and manually assigns some textual description to the mixture. Alternatively, the textual query can also be generated automatically by a device or according to any other feasible method.

This embodiment differs from the previous embodiments in that, since the audio source separation can be performed simply with the auxiliary audio database, the target audio database is optional and not necessary. In addition, the received audio mixture preferably includes at least one audio source signal not corresponding to the textual query such that the source separation of the audio mixture can be performed more precisely. Moreover, it is preferred that a user can interact with and assist the audio source separation at any stage of the whole procedure.

Figure 3:
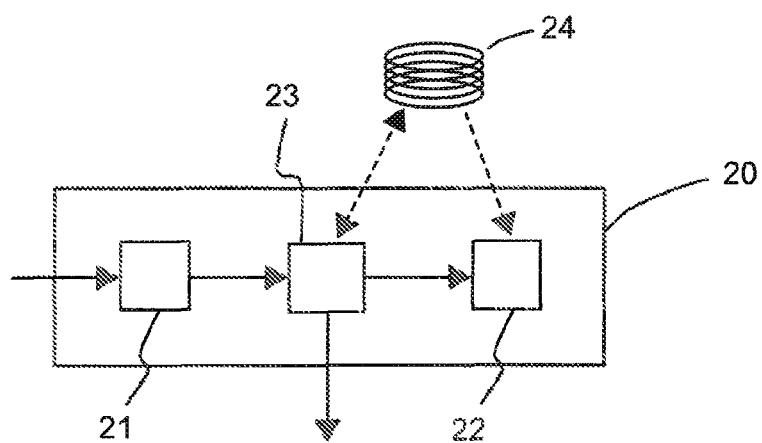
FIG. 3 is a schematic diagram to illustrate a system implementing the method of audio retrieval and source separation according to this invention.

FIG. 3 schematically illustrates an embodiment of the system 20 configured to perform the method of audio retrieval and source separation according to the present invention. The system 20 comprises an input unit 21 for receiving 10 a textual query associated to a target audio sample; a storing unit 22 for storing an target audio database; and a processing unit 23 for retrieving 11 a preliminary audio sample from an auxiliary audio database 24, for retrieving 12 the target audio sample from the target audio database stored in the storing unit 22, and for separating 13 the retrieved target audio sample into a plurality of audio source signals. Preferably, the processing unit 23 retrieves the target audio sample from the target audio database and separates the retrieved target audio sample simultaneously.

Preferably, the storing unit 22 further stores a negative data set used for the retrieval of the target audio sample from the target audio database. As described above, the negative data set can be generated by the processing unit 23 from the auxiliary database 24 where the preliminary audio sample is retrieved, or from another auxiliary database (not shown) and then stored in the storing unit 22 as a preparative of the audio retrieval and source separation of the target audio sample.

Preferably, the input unit 21 can further receive a user input for reviewing the preliminary audio sample retrieved from the auxiliary audio database 24. A user can thus interact with and assist the system 20. Preferably, the system 20 is a fully user-assisted system and a user can interact with the system at any stage of the processing of audio retrieval and source separation. The quality of such a system can be characterized by the overall user satisfaction depending mostly on the compromise between the usage facility, the time spent and the quality of the final result. The audio retrieval and source separation performed by the system 20 implementing the method according to the invention can thus become more efficient, and the result thereof is improved.

The invention claimed is:

1. A method comprising:
receiving a textual query;
retrieving a preliminary audio sample from an auxiliary audio database by matching the textual query with semantic information associated to the auxiliary audio database;
performing one of
retrieving a target audio sample from a target audio database by matching the preliminary audio sample with the target audio database; and performing an audio-source separation technique on the retrieved target audio sample for separating the retrieved target audio sample into a plurality of audio source signals, wherein retrieving the target audio sample from the target audio database and performing the audio-source separation technique on the retrieved target audio sample are performed jointly, retrieving the target audio sample from the target audio database including comparing the target audio sample with a negative data set; and
separating a target source signal of an audio mixture, said target source signal being described by said textual query, by matching the preliminary audio sample with the audio mixture.

2. The method of claim 1, comprising reviewing the preliminary audio sample retrieved from the auxiliary audio database.

3. The method of claim 2, wherein the reviewing includes segmenting or filtering the retrieved preliminary audio sample, and is performed upon receipt of a user input.

4. The method of claim 1, wherein the negative data set is generated from the auxiliary database or a second auxiliary database.

5. The method of claim 1, wherein the audio source signals of the retrieved target audio sample include at least one signal corresponding to the textual query and at least one signal not corresponding to the textual query.

6. The method of claim 1, comprising iterating some or all of the method.

7. A system comprising:
an input unit for receiving a textual query;
a processing unit for retrieving a preliminary audio sample from an auxiliary audio database by matching the textual query with semantic information associated to the auxiliary audio database, and one of:
retrieving a target audio sample from a target audio database by matching the preliminary audio sample with the target audio database and performing an audio-source separation technique on the retrieved target audio sample for separating the retrieved target audio sample into a plurality of audio source signals, wherein retrieving the target audio sample from the target audio database and performing the audio-source separation technique on the retrieved target audio sample are performed jointly, retrieving the target audio sample from the target audio database by the processing unit including comparing the target audio sample with a negative data set stored in a storing unit of said system; and
performing an audio-source separation technique on an audio source mixture for separating a target source signal described by said textual query from said audio source mixture by matching the preliminary audio sample with the audio mixture.

8. The system of claim 7, wherein the negative data set is generated from the auxiliary audio database or a second auxiliary database.

9. The system of claim 7, wherein the processing unit reviews the preliminary audio sample retrieved from the auxiliary audio database upon receipt of a user input in the input unit.

10. A non-transitory computer readable medium having stored therein instructions for performing the method according to claim 1.

11. The method of claim 1, wherein the auxiliary audio database includes an internet search engine.

12. The system of claim 7, wherein the auxiliary audio database includes an internet search engine.

13. The system of claim 7, wherein the system includes a storing unit for storing the target audio database.

14. The method of claim 1, where said target audio database is a database without semantic information associated thereto.

15. The method of claim 1, where said retrieving of said target audio sample from said target audio database is performed by an examplar-base matching between of said preliminary audio sample with the target audio database.

16. The method of claim 1, where said matching of the preliminary audio sample with the audio source mixture is an examplar-base matching.

* * * * *